(12) United States Patent
Grot

(10) Patent No.: US 6,428,921 B1
(45) Date of Patent: Aug. 6, 2002

(54) FUEL CELL STACK COMPRESSION METHOD AND APPARATUS

(75) Inventor: Stephen A. Grot, Bear, DE (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/425,379

(22) Filed: Oct. 22, 1999

(51) Int. Cl.[7] .......................... H01M 2/00; H01M 2/02; H01M 2/08
(52) U.S. Cl. ............................ 429/37; 429/34
(58) Field of Search ..................... 429/37, 34

(56) References Cited

U.S. PATENT DOCUMENTS

| | | | |
|---|---|---|---|
| 5,484,666 A | 1/1996 | Gibb et al. ................ 429/34 |
| 5,532,073 A | * 7/1996 | Hirata et al. .............. 429/34 |
| 5,547,777 A | 8/1996 | Richards | |
| 5,789,091 A | 8/1998 | Wozniczka et al. | |
| 6,040,072 A | 3/2000 | Murphy et al. ............ 429/12 |

FOREIGN PATENT DOCUMENTS

| | | |
|---|---|---|
| EP | 0 444 383 A1 | 3/1990 |
| EP | 0 981 174 A2 | 8/1999 |
| EP | 0 981 175 A2 | 8/1999 |
| JP | 61225779 | 7/1986 |
| JP | 08088018 | 2/1996 |
| JP | 11-97054 A * | 4/1999 |

* cited by examiner

Primary Examiner—Stephen Kalafut
Assistant Examiner—Julian A. Mercado
(74) Attorney, Agent, or Firm—Karl F. Barr, Jr.; Cary W. Brooks; Linda M. Deschere

(57) ABSTRACT

An electrochemical fuel cell stack comprising an upper end plate assembly; a lower end plate assembly; at least one electrochemical fuel cell assembly interposed between the upper and lower end plate assemblies; and a clamp mechanism operative to compressively clamp the stack. A plurality of screws threaded through threaded bores in the upper end plate at spaced locations in the upper end plate and bearing at their lower ends on an upper face of a distributor plate are selectively tightened to provide a substantially uniform torque in each screw whereby to assure uniform compressive loading across the area of the distributor plate and thereby across the area of the fuel cell assembly.

13 Claims, 2 Drawing Sheets

FUEL CELL STACK COMPRESSION METHOD AND APPARATUS

FIELD OF THE INVENTION

The invention relates to fuel cells and, more particularly, to fuel cells arranged in a stack and held in compression.

BACKGROUND OF THE INVENTION

Fuel cell stacks typically comprise a plurality of fuel cell assemblies stacked one upon the other and held in compression with respect to each other. Typically, each fuel cell assembly comprises an anode layer, a cathode layer, and an electrolyte interposed between the anode layer and the cathode layer. Fuel cell stacks require a significant amount of compressive force to squeeze the cells of the stack together. This force comes about from the internal gas pressure of the reactants plus the need to maintain good electrical contact between the internal components of the cell. Typically, the per area unit force is about 200 psi total. This force must be distributed evenly over the entire active area of the cell (typically 500–1,000 square centimeters for automotive size stacks). Thus, the total compressive force of these size stacks is between 16,000 and 32,000 pounds. The challenge for the designer of the stack compression mechanism is to distribute the compressive force uniformly over the cell active area.

Prior art attempts to provide this uniform compression distribution have included rigid end plates with external tie rods, rigid end plates with band clamps, semi-rigid end plates with a cavity for a gas bladder, and rigid end plates with internal tie rods passing through the cells.

In the rigid end plate with external tie rods, threaded tie rods extend from the perimeter of an upper end plate along the outside of the stack to the perimeter of the lower end plate so that the total compressive force is carried by the tie rods. The end plate must be thick enough so that a small (about less than 1 mil per cell) total deflection is achieved. The disadvantage of this system is that the end plate must be very thick as compared with all other options since the total end plate span is the largest and no other method is employed to generate even force over the entire plate area.

In the rigid end plate with band clamps, one or more band straps are wrapped around the end plates to provide a degree of support at the center of the upper end plate. This arrangement has the advantage that the bands are thin straps of metal resulting in a lesser volume consumed at the stack exterior as compared with external tie rods but has the disadvantage that it is difficult to realize a significant support at the center of the upper end plate with the straps.

In the semi-rigid end plate with a cavity for a gas bladder, the lower face of the upper end plate is hollowed out, a bladder is positioned in the end plate cavity, and the bladder is pressurized to provide the desired compressive loading of the stack. The upper end plate itself is now allowed to bend somewhat while the bladder maintains uniform force distribution over the total plate area. This arrangement has the advantage that the structural component of the upper end plate can be made thinner since it is allowed to flex considerably but has the disadvantage that it requires a cavity in the end plate with the result that the overall thickness of the end plate is significantly increased.

In the rigid end plate with internal tie rods through the cells, the tie rods extend through the center of the cells to allow the placement of the tie rods nearer to the center of the end plate. Now the total span of the bending force is not extended over the entire width of the upper end plate but rather a shorter span is achieved. This arrangement has the advantage of reducing span length of the upper end plate resulting in the ability to use a thinner end plate but has the disadvantage that it requires complex bipolar plate sealing mechanisms to enable the tie rods to pass through the cells.

SUMMARY OF THE INVENTION

This invention is directed to the provision of an improved fuel cell assembly.

More specifically, this invention is directed to the provision of an improved compression method and apparatus for a fuel cell stack.

The invention is directed to a fuel cell of the type comprising an upper end plate assembly; a lower end plate assembly; at least one electrochemical fuel cell assembly interposed between the upper and lower end plate assemblies and including an anode layer, a cathode layer, and an electrolyte interposed between the anode and cathode layers; and clamp means operative to compressively clamp the stack.

According to the invention apparatus, one of the end plate assemblies comprises an end plate confronting the fuel cell assembly and pressed against the fuel cell assembly by the clamp means; a plurality of discrete force exerting devices positioned in the end plate at spaced locations in the end plate and selectively movable relative to the end plate in an axial direction generally transverse to the general plane of the end plate; and holding means operative to maintain each force exerting device in any axial position to which it is moved relative to the end plate. With this arrangement, the discrete force exerting devices may be selectively moved relative to the end plate to assure a substantially uniform compressive loading across the area of the fuel cell assembly and the end plate itself may be relatively thin and allowed to flex.

According to a further feature of the invention apparatus, the force exerting devices and the holding means comprise screws threaded through bores in the end plate and bearing at free ends thereof against a confronting face of the fuel cell assembly. With this arrangement the screws may be selectively tightened to provide a substantially uniform torque in each screw whereby to assure a uniform compressive loading across the area of the fuel cell assembly while allowing the use of a relatively thin end plate which is allowed to flex.

According to a further feature of the invention apparatus, the one end plate assembly comprises the upper end plate assembly and the end plate comprises an upper end plate. The principles of the invention may be applied to either the upper or the lower end plate assembly or both end plates. The principles of the invention are most readily and advantageously applied to the upper end plate assembly.

According to a further feature of the invention apparatus, the upper end plate assembly further includes a distributor plate overlying the fuel cell assembly and interposed between the fuel cell assembly and the upper end plate and the lower ends of the screws bear against the upper face of the distributor plate. With this arrangement selective tightening of the screws assures a substantially uniform compressive loading across the area of the distributor plate and thereby across the area of the fuel cell assembly.

According to a further feature of the invention apparatus, the clamping means comprises tie rod assemblies interconnecting the upper and lower end plate assemblies. The compression arrangement of the invention allows conventional external tie rod assemblies to be utilized in combination with a relatively thin upper end plate.

The invention methodology relates to a method of reducing the thickness and thereby the weight of one of the end plates of an electrochemical fuel cell stack of the type comprising an upper end plate; a lower end plate; at least one electrochemical fuel cell assembly interposed between the upper and lower end plates and including an anode layer, a cathode layer, and an electrolyte interposed between the anode and cathode layers; and clamp means operative to compressively clamp the stack.

According to the invention methodology, a plurality of discrete force exerting devices are positioned in the one end plate at spaced locations in the one end plate with each force exerting device being selectively movable relative to the one end plate in an axial direction generally transverse to the general plane of the one end plate; holding means are provided which are operative to maintain each force exerting device in any axial position to which it is moved relative to the one end plate; and each force exerting device is selectively moved relative to the one end plate to assure substantial uniform compressive loading across the area of the fuel cell assembly. This methodology allows the use of a relatively thin and relatively lightweight end plate which may flex in response to the selective movement of the force exerting devices while the force exerting devices act to provide the uniform compressive loading across the area of stack.

According to a further feature of the invention methodology, the force exerting devices and the holding means comprise screws threaded through threaded through bores in the one end plate and bearing at free ends thereof against a confronting face of the fuel cell assembly and the selectively moving step comprises selectively tightening the screws to provide a substantially uniform torque in each screw. This methodology assures a uniform compressive loading across the area of the fuel cell assembly while allowing the relatively thin and relatively lightweight end plate to flex.

According to a further feature of the invention methodology, the one end plate comprises the upper end plate, the fuel cell stack further includes a distributor plate overlying the fuel cell assembly and interposed between the fuel cell assembly and the upper end plate, and the lower ends of the screws bear against the upper face of the distributor plate. With this methodology, selective tightening of the screws assures a substantially uniform compressive loading across the area of the distributor plate and thereby across the area of the fuel cell assembly.

DESCRIPTION OF THE PREFERRED EMBODIMENT

Figure 1:
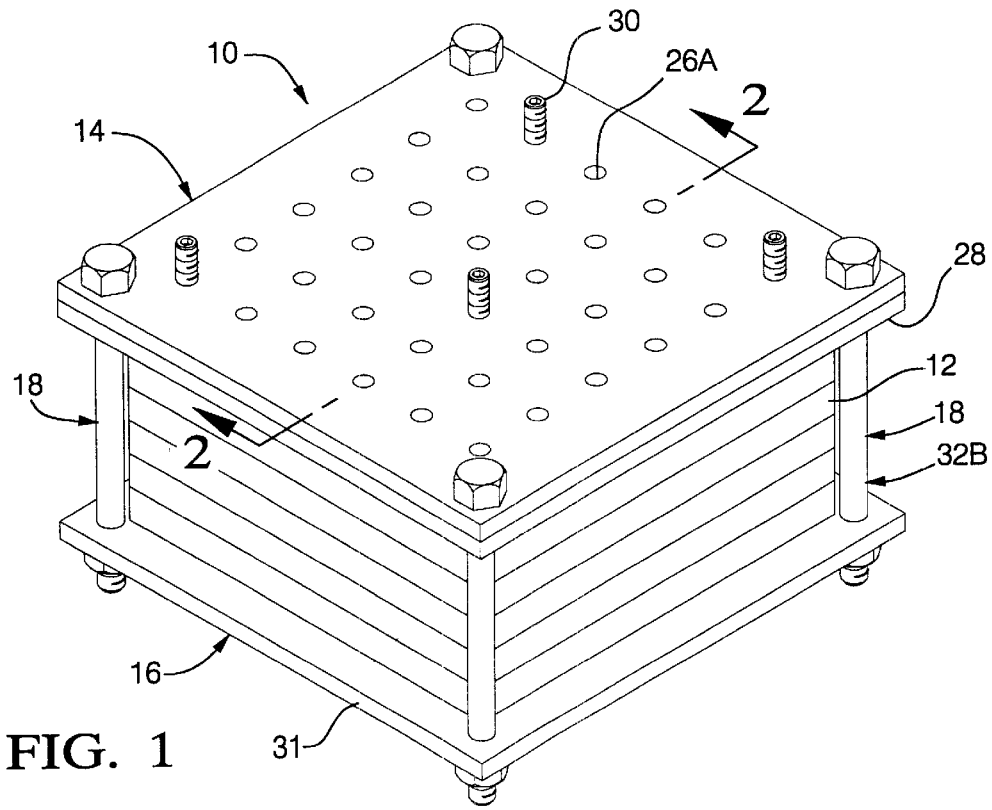
FIG. 1 is perspective view of a fuel cell stack according to the invention.
Figure 2:
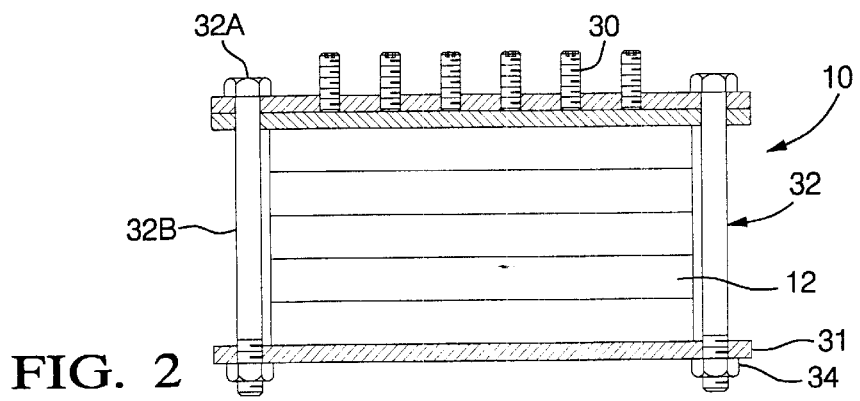
FIG. 2 is a cross-sectional view taken on 2—2 of FIG. 1.

The fuel cell stack 10 seen in FIG. 1 includes a plurality of fuel cells 12 arranged in a stacked configuration; an upper end plate assembly 14; a lower end plate assembly 16; and tie rod assemblies 18.

Figures 5, 6, 7:
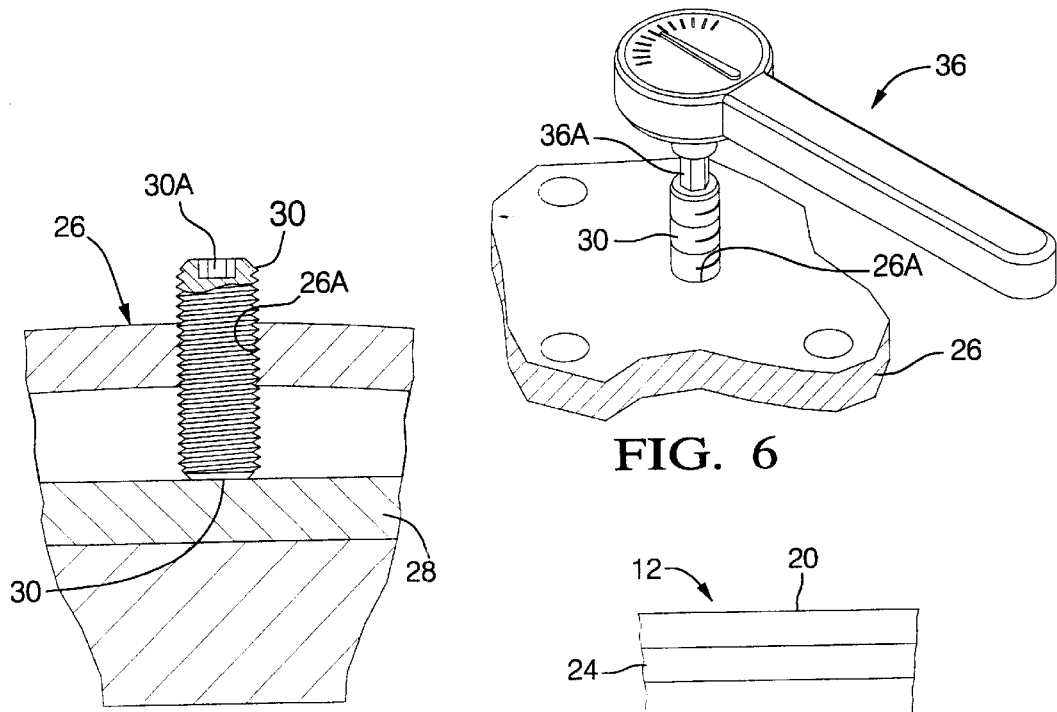
FIG. 5 is a detail view taken within the circle 5 of FIG. 3.
FIG. 6 is a fragmentary view showing details of a fuel cell.
FIG. 7 is a fragmentary perspective view showing the loading of the stack.

Each fuel cell 12 (FIG. 6) includes an anode flow fuel plate or anode layer 20; a cathode flow fuel plate or cathode layer 22; and a membrane electrode assembly or electrolyte 24.

Figure 4:
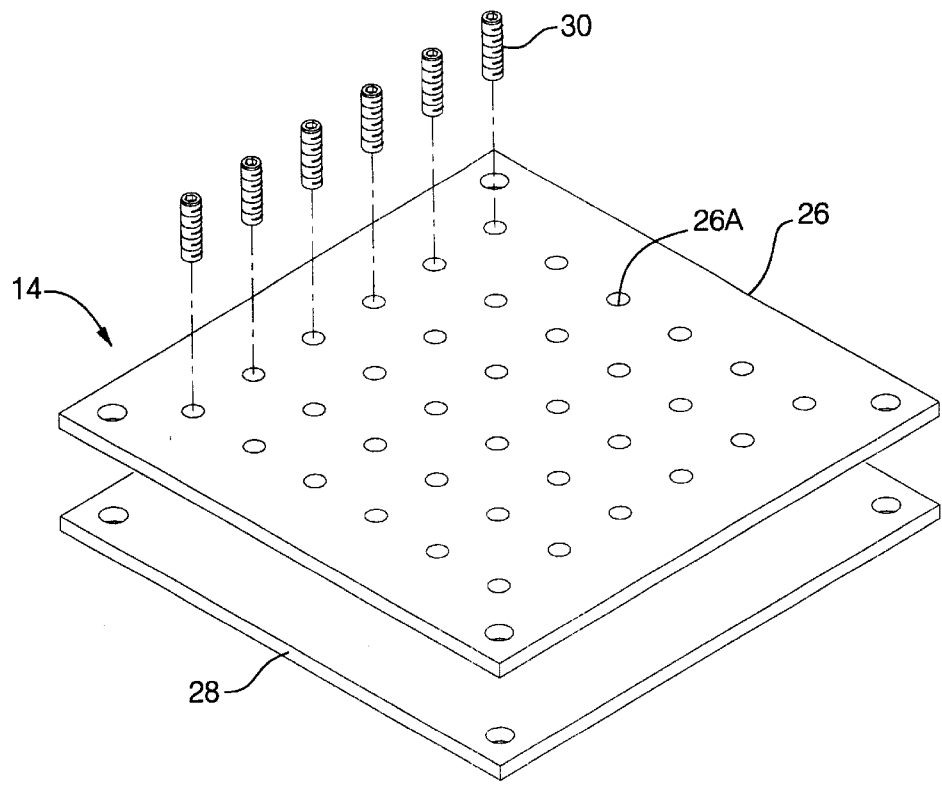
FIG. 4 is a detail perspective view showing components of an end plate assembly utilized in the invention compression apparatus.

Upper end plate assembly 14 (FIGS. 1 and 4) comprises an upper end plate 26, a current collector or distributor plate 28, and a plurality of screws 30. A plurality of spaced threaded through bores 26a are provided in upper end plate 26 in a pattern or array extending substantially over the entire surface area of the plate. The threads of bores 26a match the threads of screws 30. Screws 30 (FIG. 5) may for example comprise headless machine screws including an Allen head socket 30a in the top end of each screw.

Lower end plate assembly 16 includes a plate 31. The plate assemblies and the fuel cells may have a rectangular configuration, as shown, although other configurations may also be used. Each tie rod assembly 18 includes a bolt 32 and a nut 34. Each bolt 32 includes a head 32a and a threaded shaft portion 32b.

In the assembled relation of the fuel cell, the fuel cells 12 are stacked on top of lower end plate 31; distributor plate 28 is positioned on top of the stacks; upper end plate 26 is positioned on top of distributor plate 28; screws 30 are respectively threaded into threaded bores 26a in the upper end plate 26; tie rod assemblies 18 extend between the upper and lower end plate assemblies so as to constitute clamping means for maintaining the entire assembly in a clamped configuration; and threaded through bores 26a in upper end plate 26 are distributed in a pattern or array extending substantially over the entire surface area of the stacked fuel cells. It will be understood that, in accordance with known fuel cell technology, reactant and coolant fluid streams are supplied to and exhausted from internal manifolds and passages (not shown) in the stack.

Once the fuel cells stack has been assembled, screws 30 are selectively threaded into their respective bores 26a so as to bear on their lower ends 30a against the upper face of distributor plate 28. The screws are selectively tightened in a manner to produce a substantially uniform torque in all of the screws and thereby produce a substantially uniform compressive loading applied to the stack via the distributor plate through each of the screws. For example, and as seen schematically in FIG. 7, the screws may be tightened to a uniform predetermined torque utilizing a torque wrench 36 having an Allen head driver 36a for receipt in Allen head sockets 30a.

Figure 3:
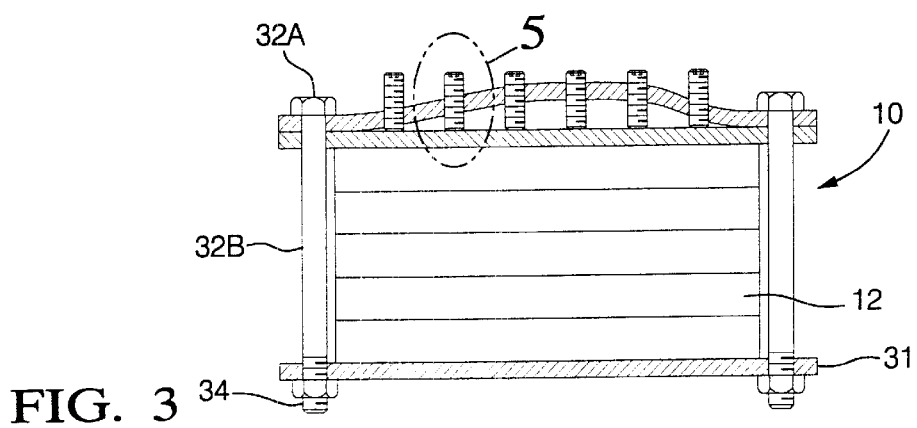
FIG. 3 is a view similar to FIG. 2 but illustrating the manner in which the fuel cell stack is compressively loaded.

Since the amount of compressive loading generated in the upper end plate by the tie rods 18 will vary depending on the distance from the tie rods with the compressive loading being at a maximum in the perimeter area of stack bounded by the tie rods and at a minimum in the center of the stack, the screws adjacent the perimeter of the stack will require a relatively minimal amount of tightening to generate a given amount of torque and compressive loading and the screws at the center of the stack will require a relatively maximum amount of tightening to produce the same given amount of torque and compressive loading. As a result, and as best seen in FIG. 3, the upper end plate 26, which may be relatively thin according to the invention to reduce the overall weight of the fuel cell assembly, is allowed to flex and assume the bowed or flexed configuration seen in exaggerated form in FIG. 3 with the perimeter areas of the upper end plate substantially contiguous with the upper face of the distributor plate, the center area of the plate bowed or flexed upwardly significantly with respect to the distributor plate, and the intermediate areas of the plate between the perimeter and the center bowed in progressively lesser amounts measured from the center to the perimeter. The selectively tightened screws as seen in FIG. 3, since they have been tightened to a uniform given torque, all exert the same axial compressive forces against the distributor plate so as to apply a uniform compressive force to the distributor plate and thereby to the cells of the stack.

It will be seen that the use of the screws 30 to apply the compressive loading to the stack allows the use of a relatively thin upper end plate since the screws effectively transmit the compressive force evenly over the stack plate area even though the end plate, by virtue of its relative thinness, is allowed to bend or flex significantly. Since the combined weight of the relatively thin upper end plate 26 and the screws 30 may be significantly less than the weight of a relatively thick end plate, the invention reduces the weight of the fuel cell assembly for a given fuel cell capacity.

Whereas a preferred embodiment of the invention has been illustrated and described in detail, it will be apparent that the various changes may be made in the disclosed embodiment without departing from the scope or spirit of the invention. For example, although tie rods have been illustrated as the clamping means for the fuel cell assembly, other clamping means, such as bands, may also be employed. Further, although the force exerting devices positioned in the end plate comprise screws in the preferred embodiment, other force exerting devices such as ratcheting pins may also be employed. Further, whereas the invention has been illustrated and described as applied to the upper end plate assembly of the fuel cell stack, similar volume and weight benefits could be realized by applying the principles of the invention to the lower end plate assembly. In addition, it is to be understood that the invention as illustrated and described is applicable to both the upper and lower plates, at the same time.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. An electro-chemical fuel cell stack comprising an upper end plate assembly, a lower end plate assembly, at least one electrochemical fuel cell assembly interposed between the upper and lower end plate assemblies, and clamp means operative to compressively clamp the stack, characterized in that at least one of said upper and lower end plate assemblies comprises:
    an end plate confronting the fuel cell assembly and pressed against the fuel cell assembly by the clamp means;
    a plurality of screws threaded through the end plate and bearing at a free end thereof against a confronting face of the fuel cell assembly, each of the screws being selectively moveable relative to the end plate in an axial direction generally transverse to the general plane of the end plate to an axial position and operative to maintain the axial position, whereby by a uniform compressive loading across a surface area of the fuel cell assembly is provided.

2. An electrochemical fuel cell stack according to claim 1 wherein: said one end plate assembly comprises the upper end plate assembly; and
    said end plate comprises an upper end plate.

3. An electrochemical fuel cell stack according to claim 2 wherein the upper end plate assembly further includes a distributor plate overlying the fuel cell assembly and interposed between the fuel cell assembly and the upper end plate; and
    lower ends of the screws bear against an upper face of the distributor plate whereby selective tightening of the screws assures a substantially uniform compressive loading across the area of the distributor plate and thereby across the area of the fuel cell assembly.

4. An electrochemical fuel cell stack according to claim 3 wherein the clamp means comprises tie rod assemblies interconnecting the upper and lower end plate assemblies.

5. A method of assembling an electrochemical fuel cell stack of the type comprising an upper end plate, a lower end plate, at least one electrochemical fuel cell assembly interposed between the upper and lower end plates, and clamp means operative to compressively clamp the stack, the method comprising:
    positioning a plurality of screws through threaded bores at spaced locations in one end plate such that a free end of each screw bear against a confronting face of the fuel cell assembly; and
    selectively moving each of said plurality of screws relative to said one end plate in an axial direction generally transverse to the general plane of the end plate to an axial position and maintaining said axial position, thereby flexing said one end plate to provide a uniform compressive loading across a surface area of the fuel cell assembly.

6. A method according to claim 5 wherein said at least one plate is the upper end plate.

7. A method according to claim 6 wherein the fuel cell stack further includes a distributor plate overlying the fuel cell assembly and interposed between the fuel cell assembly and the upper end plate; and the lower ends of the screws bear against an upper face of the distributor plate whereby selective tightening of the screws assures a substantially uniform compressive loading across a distributor plate surface and thereby across an opposing surface of the fuel cell assembly.

8. A method according to claim 7 wherein the clamp means comprises tie rod assemblies interconnecting the upper and lower end plates.

9. In an electrochemical fuel cell stack comprising an upper end plate; a lower end plate; at least one electrochemical fuel cell assembly interposed between the upper and lower end plate assemblies and including an anode layer, a cathode layer, and an electrolyte interposed between the anode and cathode layers; and clamp means operative to compressively clamp the stack, a method of assembling a fuel cell stack, the method comprising:
    positioning a plurality of screws through threaded bores at spaced locations in the upper end plate such that free ends of the screws bear against a confronting face of the fuel cell assembly; and
    selectively moving each of said plurality of screws relative to the upper end plate to an axial position to apply compressive loading to the fuel cell assembly and maintaining said axial position, thereby allowing the use of a relatively thin and relatively lightweight upper end plate which flexes in response to the selective movement of the screws to exert a substantially uniform compressive loading across a surface area of the fuel cell assembly.

10. A method according to claim 9 wherein the fuel cell stack further includes a distributor plate overlying the fuel cell assembly and interposed between the fuel cell assembly and the upper end plate; and the free ends of the screws bear against an upper face of the distributor plate whereby selective tightening of the screws assures a substantially uniform compressive loading across a surface of the distributor plate and thereby across the surface of the fuel cell assembly.

11. A method according to claim 10 wherein the clamping means comprises tie rod assemblies interconnecting the upper and lower end plate assemblies.

12. An electrochemical fuel cell stack comprising an upper end plate assembly; a lower end plate assembly; at least one electrochemical fuel cell assembly interposed between the upper and lower end plate assemblies and including an anode layer, a cathode layer, and an electrolyte interposed between the anode and cathode layers; and clamp means operative to compressively clamp the stack, characterized in that the upper end plate assembly comprises;

a distributor plate overlying the fuel cell assembly and pressed against the fuel cell assembly by the clamp means;

an upper end plate overlying the distributor plate and pressed against the distributor plate by the clamp means; and a plurality of screws threaded through threaded through bores in the upper end plate at spaced locations in the upper end plate and bearing at their lower ends on a upper face of the distributor plate, whereby the screws may be selectively tightened to provide a substantially uniform torque in each screw whereby to assure a uniform compressive loading across a distributor plate surface and thereby across a surface area of the fuel cell assembly.

13. An electrochemical fuel cell stack according to claim 12 wherein the clamp means comprises tie rod assemblies interconnecting the upper and lower end plate assemblies.

* * * * *